(12) United States Patent
Getsy

(10) Patent No.: US 11,760,585 B2
(45) Date of Patent: Sep. 19, 2023

(54) MOMENTUM ARRESTING RAMP

(71) Applicant: American Sterilizer Company, Mentor, OH (US)

(72) Inventor: Andrew Paul Getsy, Kirtland, OH (US)

(73) Assignee: American Sterilizer Company, Mentor, OH (US)

( * ) Notice: Subject to any disclaimer, the term of this patent is extended or adjusted under 35 U.S.C. 154(b) by 682 days.

(21) Appl. No.: 16/992,300

(22) Filed: Aug. 13, 2020

(65) Prior Publication Data

US 2021/0053783 A1 Feb. 25, 2021

Related U.S. Application Data

(60) Provisional application No. 62/890,175, filed on Aug. 22, 2019.

(51) Int. Cl.
*B65G 69/28* (2006.01)
*B65D 19/38* (2006.01)
*B65D 88/54* (2006.01)

(52) U.S. Cl.
CPC ......... *B65G 69/2876* (2013.01); *B65D 19/38* (2013.01); *B65D 88/542* (2013.01); *B65D 2519/0098* (2013.01)

(58) Field of Classification Search
CPC .. B65G 69/2849; B65D 19/38; B65D 88/542; B65D 19/0098
USPC ........................................................ 14/69.5
See application file for complete search history.

(56) References Cited

U.S. PATENT DOCUMENTS

| | | | |
|---|---|---|---|
| 4,478,549 A | 10/1984 | Stelly et al. | |
| 5,505,140 A | 4/1996 | Wittmann | |
| 5,794,292 A * | 8/1998 | Ricci, Jr. ................ | B63B 27/14 182/1 |
| 5,911,179 A * | 6/1999 | Spiczka ............. | B65D 19/0095 108/51.11 |
| 7,310,843 B1 * | 12/2007 | Mitchell .............. | B65D 88/542 14/69.5 |
| 9,855,877 B2 | 1/2018 | Aftanas et al. | |
| 10,207,881 B2 | 2/2019 | Deshpande et al. | |
| 2004/0108238 A1 | 6/2004 | Maresh | |
| 2005/0055783 A1 | 3/2005 | Peschmann | |

(Continued)

FOREIGN PATENT DOCUMENTS

| | | |
|---|---|---|
| WO | 2008043368 A2 | 4/2008 |
| WO | 2018163094 A1 | 9/2018 |

*Primary Examiner* — Raymond W Addie
(74) *Attorney, Agent, or Firm* — Renner, Otto, Boisselle & Sklar, LLP

(57) ABSTRACT

A momentum arresting ramp that includes a plurality of steps that each includes a slider receiving surface and a transition surface. The steps may enable a device with wheels to be moved down the ramp by a user, without inconvenient gravity building momentum of the device down the ramp. For example, the steps may be spaced apart along a first axis such that a first slider of the device is never in contact with one of the transition surfaces when a second slider of the device is in contact with another one of the transition surfaces. The configuration of the steps and the sliders may enable the device (e.g., a device heavy enough to typically require two users to unload using a planar ramp) to be easily and conveniently unloaded by a single user.

21 Claims, 10 Drawing Sheets

(56) References Cited

U.S. PATENT DOCUMENTS

| | | | |
|---|---|---|---|
| 2007/0101516 A1* | 5/2007 | Carrigan | E01D 15/24 14/69.5 |
| 2007/0102315 A1 | 5/2007 | Garcia De Alba | |
| 2007/0199166 A1 | 8/2007 | Peschmann | |
| 2008/0034512 A1 | 2/2008 | Meyers | |
| 2009/0324373 A1 | 12/2009 | Campbell | |
| 2012/0017383 A1* | 1/2012 | Honeycutt | F16C 35/00 29/428 |
| 2017/0081114 A1 | 3/2017 | Mueller | |

* cited by examiner

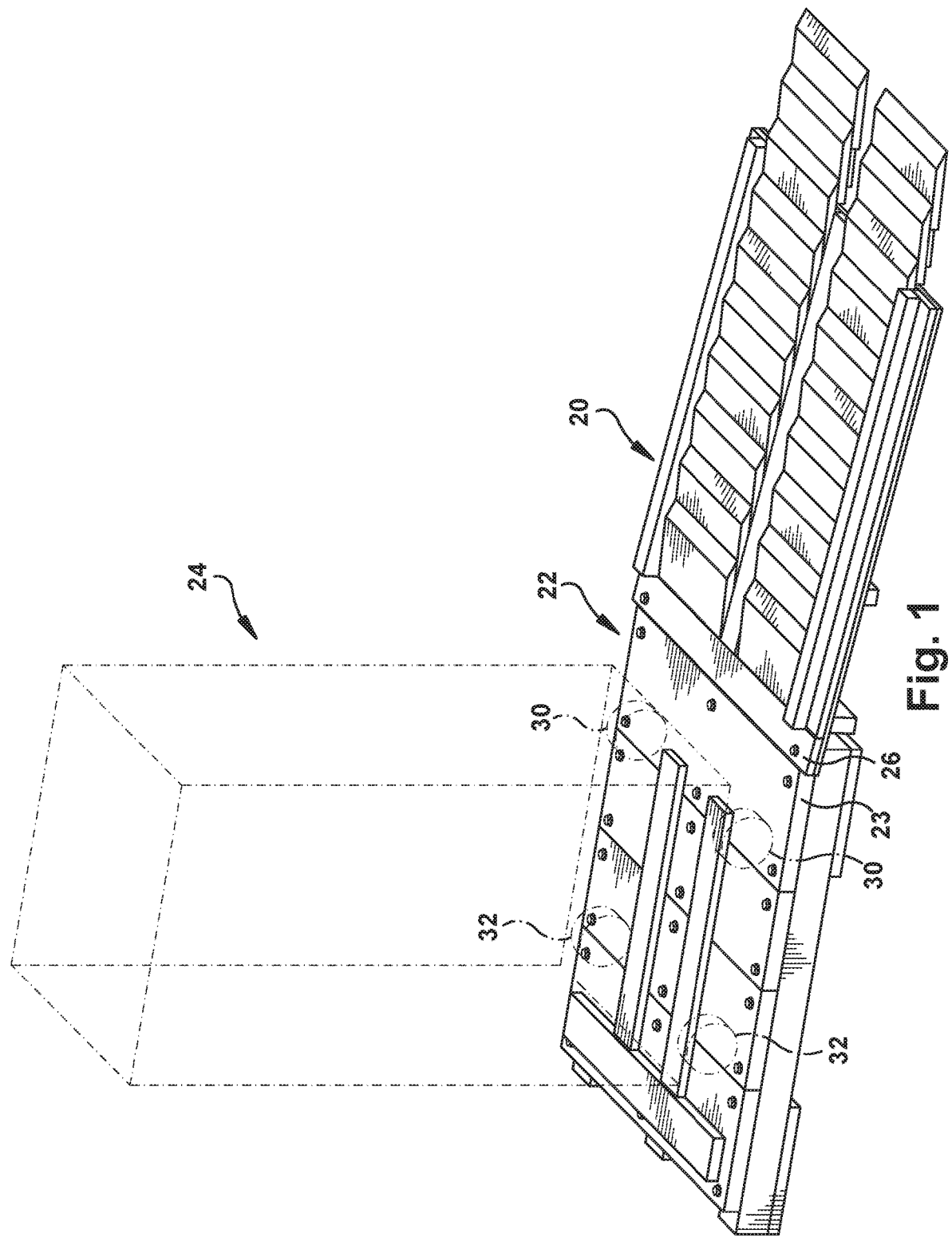

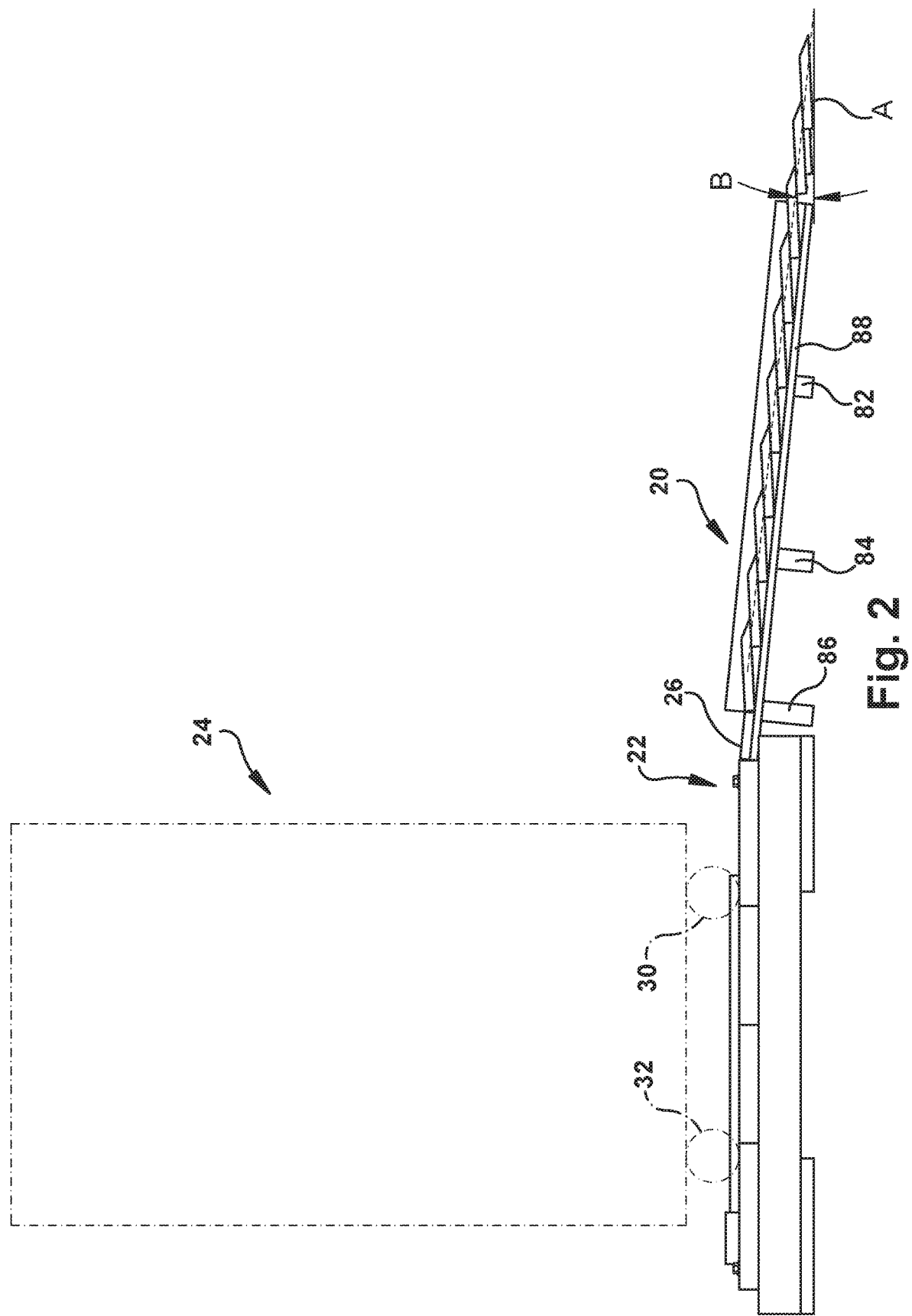

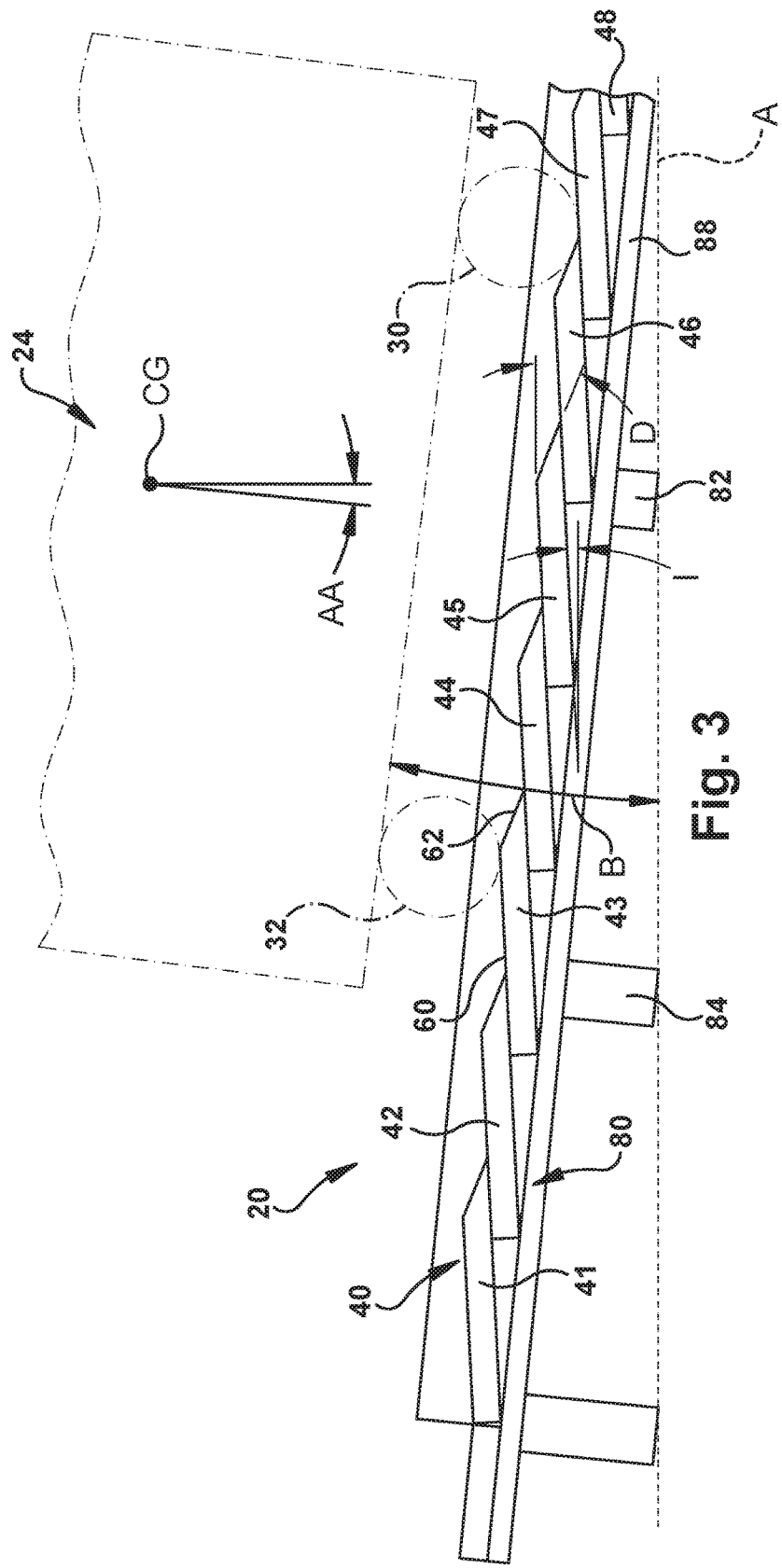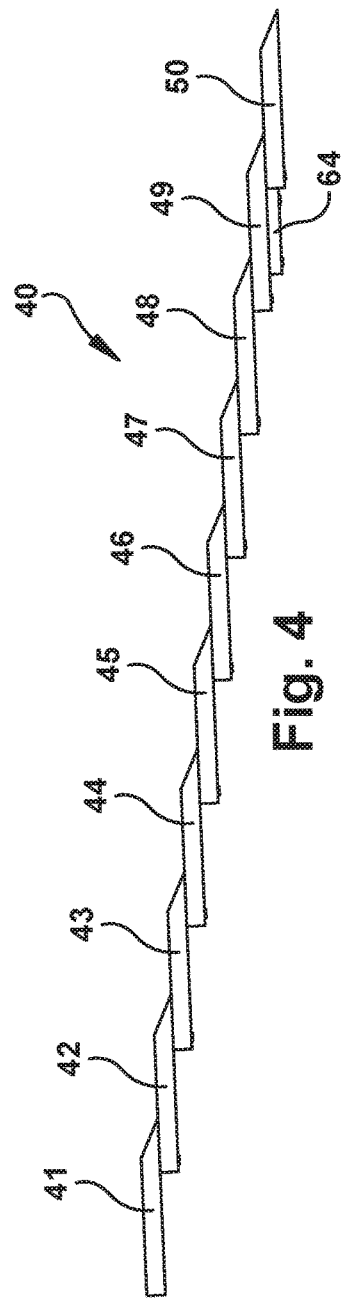

MOMENTUM ARRESTING RAMP

This application claims priority to U.S. Patent Application No. 62/890,175 filed Aug. 22, 2019. This prior application is incorporated herein by reference.

FIELD OF INVENTION

The present invention relates generally to loading and unloading of devices, and more particularly to momentum arresting ramps for loading and/or unloading devices.

BACKGROUND

Often payloads are placed on top of an elevated base, such as a shipping to pallet, for transport. The pallet may include a raised platform and side openings underneath the platform that allow the pallet to be readily moved (e.g., by pallet jack or a forklift).

At times, planar ramps have been used to facilitate unloading of the payloads from the pallets. For example, some payloads include wheels that allow the payloads to be rolled down the planar ramp and off of the pallet. When the payload (e.g., a medical device treatment system such as a washer, disinfector, or a sterilizer) has an awkward weight distribution or is heavy, it may be difficult for a single user to easily and conveniently unload the payload since such a payload may build up too much momentum for a single user to easily and conveniently roll the payload down the planar ramp. Accordingly, two users may be required to unload such a payload from a pallet.

SUMMARY OF INVENTION

The present application provides a momentum arresting ramp that includes a plurality of steps that each includes a slider receiving surface and a transition surface. The steps may enable a device (an example of a payload—e.g., a medical device treatment system such as a washer, disinfector, or a sterilizer) with wheels to be moved down the ramp by a user, without inconvenient gravity building momentum of the device down the ramp. For example, the steps may be spaced apart along a first axis such that a first slider of the device is never in contact with one of the transition surfaces when a second slider of the device is in contact with another one of the transition surfaces. The configuration of the steps and the sliders may enable the device (e.g., a device heavy enough to typically require two users to easily and conveniently unload using a planar ramp) to be easily and conveniently unloaded by a single user.

The momentum arresting ramp may resist some of the gravitational force exerted on the payload to more gradually urge the payload down the ramp as the wheeled payload is moved down the ramp. A typical payload is shipped in a crate made of a shipping skid (or other type of base), a plurality of upright walls, and a top. The payload securely rests on the shipping skid during transport. In an embodiment, after the payload is received in the crate, the walls and top of the crate are removed. A load bearing portion of the top of the crate may be attached to the front of the shipping skid. The plurality of steps may be attached to the top of the load bearing portion.

The payload may then be moved down the ramp and the slider receiving surfaces may enable resistance of forward momentum of the payload to the bottom of the ramp. For example, the slider receiving surfaces may be inclined to a horizontal plane resulting in some gravitational forces acting on the payload to resist forward momentum and counter the gravitational forces urging part of the payload down the ramp. Friction may also resist forward momentum of the payload. In some embodiments, the slider receiving surfaces are parallel to the horizontal plane and friction resists forward momentum of the payload.

As mentioned above, resisting forward momentum may allow the payload to be more easily and conveniently pushed (or pulled) forward down the ramp by a single user, without requiring the user or a second user to resist momentum or otherwise grapple with the descent of the payload down the ramp. For example, the ramp may entirely counter forces due to gravity that urge the payload forward and down the ramp. Entirely countering such forces may ensure the payload will not move down the ramp unless a threshold forward force is applied by the user to the payload.

The ramp may be configured based on the configuration of the wheels (or other types of sliders) of the payload. For example, the height, depth, and/or horizontal spacing of the plurality of steps may be configured based on the diameter of the wheels and/or the wheelbase spacing.

The top of the crate may be configured to form a load bearing portion of the momentum arresting ramp and thus may be disposed in front of the payload. Forming part of the crate with part of the ramp (e.g., the load bearing portion) enables a reduction in the number of parts that need to be manufactured for the crate and the ramp.

In some cases, the payload may be detached from the shipping skid and all other shipping items (e.g., exterior boxes, side panels, foam blocks, wooden stops, etc.) prior to moving the payload down the ramp.

According to one aspect of the invention, a momentum arresting ramp includes a plurality of steps that are at least partially offset from one another along a first axis, each step including a slider receiving surface that faces in a first direction that is transverse to the first axis, the slider receiving surface of each step preceding a following step, respectively, of the plurality of steps being offset in the first direction from the respective following step, in aggregate the plurality of steps declining relative to the first axis, each of the plurality of steps including a transition surface that is declined relative to its own slider receiving surface and declined less than 90 degrees relative to the first axis toward the respective following step, where the slider receiving surface and the transition surface are at respective first and second angles relative to the first axis, the first angle being different than the second angle, each slider receiving surface being parallel to or inclined relative to the first axis.

Each slider receiving surface may be inclined relative to the first axis by an incline angle anywhere above 0 degrees up to 20 degrees.

The ramp may further include feet that face in a second direction opposite the first direction, and each foot may have an end that contacts a plane that is parallel with the first axis.

The second direction may be parallel to the direction of gravity acting on the ramp.

Each step may overlap each adjacent step of the plurality of steps.

The decline of the aggregate the plurality of steps relative to the first axis may be a decline angle less than 20°.

The slider receiving surfaces may be planar.

The momentum arresting ramp may be in combination with the device.

Packaging may include the ramp or the momentum arresting ramp and the device, and at least part of the ramp may form a wall of the packaging.

A load bearing portion with a planar major surface may form a top of the packaging and may be configured to attach to a base of the packaging.

According to another aspect of the invention, a momentum arresting ramp in combination with a device is provided. The device includes a first slider and a second slider that is offset from the first slider by a first distance along a first axis. The momentum arresting ramp includes a plurality of steps that are at least partially offset from one another along the first axis, each step including a slider receiving surface that faces in a first direction that is transverse to the first axis, the slider receiving surface of each step preceding a following step, respectively, of the plurality of steps being offset in the first direction from the respective following step, in aggregate the plurality of steps declining relative to the first axis, each of the plurality of steps including a transition surface that is declined relative to its own slider receiving surface and is declined less than 90 degrees relative to the first axis toward the respective following step, where the slider receiving surface and the transition surface are at respective first and second angles relative to the first axis, the first angle being different than the second angle. The transition surfaces and the slider receiving surfaces are configured such that when the first slider and the second slider are on the ramp, and the first slider is in contact with one of the transition surfaces, the second slider is in contact with one of the slider receiving surfaces, the first and second sliders and the transition surfaces being spaced apart along the first axis such that the first slider is never in contact with one of the transition surfaces when the second slider is in contact with another one of the transition surfaces.

When the first slider and the second slider contact the ramp a center of gravity of device may remain axially between the first slider and the second slider along the first axis, where an actual tilt angle of the device may be unable to exceed a tipping point angle of the device.

The sliders may be wheels.

The device may further include a third slider that is offset from the first slider along a first lateral direction perpendicular to the first axis and the first direction, and may further include a fourth slider that is offset from the second slider along the lateral direction and that is offset from the third slider by the first distance along the first axis.

Each slider receiving surface may be inclined relative to the first axis by an angle anywhere above 0 degrees up to 20 degrees.

A pallet may be in combination with the momentum arresting ramp and the device. The first slider and the second slider may rest on a support surface of the pallet assembly. The ramp may be configured to attach to the pallet.

According to another aspect of the invention, a momentum arresting ramp comprises a plurality of slider receiving surfaces, and a plurality of transition surfaces, the slider receiving surfaces and the transition surfaces being alternately arranged relative to one another, in aggregate, the slider receiving surfaces and the transition surfaces being disposed at a declination angle relative to a first axis, the slider receiving surfaces being parallel to or inclined less than 90 degrees relative to the first axis, and the transition surfaces being declined greater than 0 degrees and less than 90 degrees relative to the first axis.

According to another aspect of the invention, a method of moving a device along a momentum arresting ramp is provided. The device includes a first slider and a second slider that is offset from the first slider by a first distance along a first axis. The momentum arresting ramp includes a plurality of steps that are at least partially offset from one another along the first axis, each step including a slider receiving surface that faces in a first direction that is transverse to the first axis, the slider receiving surface of each step preceding a following step, respectively, of the plurality of steps being offset in the first direction from the respective following step, in aggregate the plurality of steps declining relative to the first axis, and each of the plurality of steps includes a transition surface that is declined relative to its own slider receiving surface and is declined less than 90 degrees relative to the first axis toward the respective following step, where the slider receiving surface and the transition surface are at respective first and second angles relative to the first axis, the first angle being different than the second angle. The method includes sliding the first slider and the second slider forward along the first axis and down the ramp, where at most only one of the first slider and the second slider move downward at any moment throughout the sliding of the first slider and the second slider down the ramp.

When the first slider moves downward along one of the transition surfaces, the second slider may either move horizontally or upward along one of the slider receiving surfaces.

The first slider may contact and slide down one of the transition surfaces while the second slider contacts and slides along one of the slider receiving surfaces, and throughout sliding the first slider may never be in contact with one of the transition surfaces when the second slider is in contact with another one of the transition surfaces.

The features associated with any of the above aspects may be used in combination with any of the other aspects. For example, any of the above momentum arresting ramps may be in combination with any of the above devices, any of the above steps may have any of the above slider receiving surfaces, any of the above steps may have any of the above transition surfaces, and/or any of the above methods may use any of the above momentum arresting ramps.

The foregoing and other features of the invention are hereinafter described in greater detail with reference to the accompanying drawings.

BRIEF DESCRIPTION OF THE DRAWINGS

FIG. 1 is an oblique view of a momentum arresting ramp in combination with a shipping skid and a medical device treatment system on top of the shipping skid.

FIG. 2 is a cross-sectional side view of the momentum arresting ramp, the shipping skid, and the medical device treatment system of FIG. 1.

FIG. 3 is a cross-sectional side view of the momentum arresting ramp and the medical device treatment system of FIG. 1 on an intermediate part of the momentum arresting ramp.

FIG. 4 is a side view of a step-down ramp of the momentum arresting ramp of FIG. 1 that includes multiple steps.

DETAILED DESCRIPTION

Figure 5:
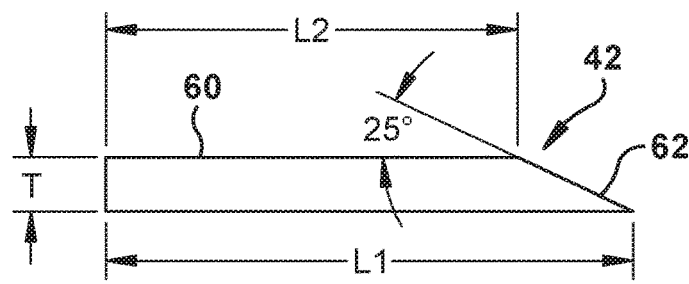
FIG. 5 is a side view of the steps of one of the step-down ramps of FIG. 4.

The principles of this present application have particular application to ramps for moving devices from a shipping skid, such as rolling a medical device treatment system off of the shipping skid to the floor, and thus will be described below chiefly in this context. It will be appreciated that principles of this invention may be applicable to other devices where it is desirable to move the device to or from an elevated surface.

Referring now in detail to the drawings, and initially to FIGS. 1-2, a momentum arresting ramp 20 according to one embodiment is illustrated in combination with a shipping skid 22 (an example of a base or pallet) and a medical device treatment system 24 (an example of a payload and schematically represented). As mentioned above, the medical device treatment system 24 may be disposed on top of the shipping skid 22 (e.g., during and after transport).

A rear end 26 of the momentum arresting ramp 20 may be attached to a front end 23 of the shipping skid 22 to allow the payload to be moved (e.g., slid as by rolling using wheels or sliding using high lubricity surfaces) from the shipping skid 22 onto the momentum arresting ramp 20. For example, the rear end 26 may be contiguous or substantially contiguous with an adjacent upward facing surface of the shipping skid 22. The medical device treatment system 24 may include front wheels 30 and rear wheels 32 (examples of sliders) and the medical device treatment system 24 may be slid from the top of the shipping skid 22 to the rear end 26 of the momentum arresting ramp 20 and down the momentum arresting ramp 20, as discussed in more detail below.

Turning now to FIG. 3, the medical device treatment system 24 may include two front wheels 30 and two rear wheels 32, all of which are shown in FIG. 1. The two front wheels 30 may be offset sideways, i.e., laterally (into the page illustrating to FIG. 3, e.g., perpendicular to a horizontal axis A) from one another. Similarly, the rear wheels 32 may be offset sideways, i.e., laterally (into the page illustrating FIG. 3, e.g., perpendicular to the horizontal axis A) from one another. The horizontal axis A as used herein defines a side view of a plane, such as a floor of a shipping destination, on which the shipping skid 22 and the momentum arresting ramp 20 are situated for example during unloading of the medical device treatment system 24. The front wheels 30 are spaced from the rear wheels 32 by a predetermined distance, also referred to herein as the wheelbase of the payload of the medical device treatment system 24.

Each side of the momentum arresting ramp 20 (also referred to as "ramp" herein) may include a step-down ramp 40 that includes multiple steps 41-50 (which are labeled in FIG. 4) that are at least partially offset from one another along the horizontal axis A. In aggregate, the steps 41-50 decline relative to the horizontal axis A wherein the plane from which the declination angle B is determined passes through a common location of each step, for example, through the downward most location of the steps (rightward-most location of the steps in FIG. 2). For example, the steps 41-50 may decline from the top of the shipping skid 22 (shown in FIGS. 2 and 3) down to the floor, at a declination angle of B degrees (°) or less relative to the horizontal axis A. In the illustrative embodiment, B is about six degrees (6°). The tipping point (also referred to as a tipping point angle) of the medical device treatment system 24 is the angle at which the medical device treatment system 24 may tip over, and typically will be about 20 degrees (20°) greater than the actual tilt angle AA (see FIG. 3), which will hover above, at, and below six degrees (6°) depending on the position of the front and rear wheels 30, 32 of the medical device treatment system 24 on the steps 41-50 as the medical device treatment system 24 is slid down the ramp 20. Thus, in the FIGS. 2-3 embodiment, the tipping point angle is about 26 degrees (26°) relative to the horizontal axis A.

When the front wheels 30 and the rear wheels 32 contact the ramp 20 a downward payload force through the center of gravity CG of the medical device treatment system 24 and perpendicular to the horizontal axis A remains axially between the front wheels 30 and the rear wheels 32 along the horizontal axis A. For example, as discussed further below with reference to FIGS. 6-7, when the medical device treatment system 24 is moved down the ramp 20, the downward payload force through the center of gravity CG remains axially between the front wheels 30 and the rear wheels 32 throughout movement down the ramp 20 such that the actual tilt angle AA is well within and unable to exceed the tipping point angle of the medical device treatment system 24.

In an embodiment, the steps decline in aggregate at a declination angle B of 30 degrees (30°) or less relative to the horizontal axis A, where the tipping point angle of the medical device treatment system is 50 degrees (50°) relative to the horizontal axis A. As will be appreciated, this may be the case where the center of gravity CG of the medical device treatment system is closer to the bottom of the medical device treatment system and/or where the center of gravity CG is closer to the rear part (left in FIGS. 1 and 3) of the medical device treatment system and/or where the wheelbase is longer.

In another embodiment, the steps decline in aggregate at declination angle B of 20 degrees (20°) or less relative to the horizontal axis A, where the tipping point angle of the medical device treatment system is 40 degrees (40°) relative to the horizontal axis A. As will be appreciated, this may be the case where the center of gravity CG of the medical device treatment system is closer to the top of the medical device treatment system (i.e., top heavy) and/or where the center of gravity CG of the medical device treatment system is closer to the front part (right in FIGS. 1 and 3) of the medical device treatment system and/or where the wheelbase is shorter. In another embodiment, the steps decline in aggregate at declination angle B of anywhere from five degrees (5°) to 20 degrees (20°) relative to the horizontal axis A, where the tipping point angle of the medical device treatment system is 40 degrees (40°) relative to the horizontal axis A. As will be appreciated, this may be the case where the center of gravity CG of the medical device treatment system 24 is at or close to the geometric center of the medical device treatment system 24.

It will further be appreciated, then, that the steps 41-50 may decline in the aggregate at declination angle B of anywhere from five degrees (5°) to 30 degrees (30°) so long as the tipping point angle is greater than the angle of decline, preferably 20 degrees (20°) greater than the angle of decline.

The ramp 20 may include ten steps 41-50 and each step 41-50 may be formed by a distinct body (illustrated by way of example in FIG. 5). For example, each step 41-50 may be made of a rigid panel with planar top and bottom surfaces. In an embodiment, at least two or more of the steps may be formed as a single rigid body.

In an embodiment, three or more steps are provided. In another embodiment, nine, ten, or more than ten steps are provided. In some embodiments, one or more of the steps may include a non-planar portion (e.g., a curved) in the respective top or the respective bottom surface.

Each step 41-50 may include a slider receiving surface 60 that faces upward transverse to the horizontal axis A. Each step 41-50 also may include a transition surface 62 that is declined relative to its own slider receiving surface 60. The transition surface 62 may be declined by anywhere from five degrees (5°) to 90 degrees (90°) relative to the slider receiving surface 60. In some embodiments, the transition surface is declined anywhere from ten degrees (10°) to 30 degrees (30°) relative to the slider receiving surface 60. In the embodiment of FIG. 5, the transition surface 62 is declined by 25 degrees (25°) relative to the slider receiving surface 60.

The transition surfaces 62 and the slider receiving surfaces 60 may be configured such that when the front wheels 30 and the rear wheels 32 are on the ramp 20, and the front wheels 30 are in contact with corresponding transition surfaces 62, the rear wheels 32 are in contact with corresponding slider receiving surfaces 60. For example, the front wheels 30, the rear wheels 32, and the transition surfaces 62 may be spaced apart along the horizontal axis A such that each front wheel 30 is never in contact with one of the transition surfaces 62 when the rear wheel 32 is in contact with another one of the transition surfaces 62 (up the ramp 20 from the front wheel 30).

Still referring to FIG. 5, the slider receiving surfaces 60 are planar and extend along a plane that is inclined about 3° relative to the horizontal axis A. Thus, the slider receiving surfaces 60 may be parallel to or inclined relative to the horizontal axis A. Other embodiments are contemplated. In another embodiment, for example, each slider receiving surface 60 may be inclined relative to the horizontal axis A by an inclination angle I anywhere above zero degrees (0°) up to 20 degrees (20°). In an alternative embodiment, one or more of the slider receiving surfaces are declined relative to the horizontal axis A, for example, anywhere from zero degrees (0°) up to 20 degrees (20°), for example, in the case where the friction between the slider receiving surfaces 60 and the wheels 30, 32 is high. It will also be appreciated that one or more of the slider receiving surfaces 60 may be non-planar (e.g., curved including multiple ribs and/or depressions as such slider receiving surface 60 inclines (or declines) relative to the horizontal axis A. It will be appreciated that the inclination angle I for the slider receiving surfaces 60 need not all be the same, as illustrated, and it is contemplated that some or all of the inclination angles I may be different.

Referring to FIG. 3, the slider receiving surface 60 of each step 41-49 that precedes a following step 42-50, respectively, is offset in a direction transverse to the horizontal axis A (or relatively upward in FIG. 3), in the illustrative embodiments a direction perpendicular to the horizontal axis A, from the respective following steps 42-50. For example, the slider receiving surface 60 of the step 42 is offset in the direction transverse to the horizontal axis A from the following step 43, and the slider receiving surface 60 of the step 42 is offset in the direction transverse to the horizontal axis from the following step 44, and so on. It will be appreciated that the offsets for the slider receiving surfaces 60 need not all be the same, as illustrated, and it is contemplated that in certain embodiments some or all of the offsets may be different.

Further, the transition surface 62 of each step 41-49 is declined 90 degrees (90°) or less relative to the horizontal axis A from the respective following step 42-50. In the FIG. 3 embodiment, for example, the transition surfaces 62 extend along a plane that is declined relative to the horizontal axis A by a declination angle D of 22 degrees (22°) or about 22 degrees (22°). As will be appreciated, the transition surfaces 62 may be declined anywhere between 90° and 0° relative to the horizontal axis A, in most cases declined anywhere from five degrees (5°) to 35 degrees (35°) relative to the horizontal axis A. It will further be appreciated that one or more of the transition surfaces 62 may be non-planar (e.g., curved or to including multiple ribs and/or depressions) as such transition surface 62 declines relative to the horizontal axis A. It will still further be appreciated that the declination angle D for the transition surface 62 need not all be the same, as illustrated, and it is contemplated that some or all of the declination angles may be different.

The slider receiving surfaces 60 and the corresponding transition surfaces 62 may be at different angles relative to the horizontal axis A. In the FIG. 3 embodiment, for example, the slider receiving surfaces 60 are at an inclination angle I of about three degrees (3°) relative to the horizontal axis A, while the transition surfaces 62 are at the declination angle D of about 22 degrees (22°) relative to the horizontal axis A. Other embodiments are contemplated. For example, different angles may be symmetrically realized for example wherein the slider receiving surfaces are at an inclination angle of about 22.5 (22.5°) relative to the horizontal axis A, while the transition surfaces 62 are at the declination angle D of about 22.5 degrees (22.5°) relative to the horizontal axis A.

Turning briefly to FIG. 5 and then FIG. 4, each step 41-50 (only step 42 being illustrated in FIG. 5) may have a thickness T and a length L1. The corresponding slider receiving surface 60 may have a length L2 and may form a planar major surface of the corresponding step 41-50.

Turning briefly to FIG. 4 and then back to FIG. 3, the step-down ramp 40 may include a support panel 64 that supports the step 49 by contacting at its lower surface the floor of the shipping destination and contacting at its upper surface the underside of the step 49 (next to the lowermost step 50) when the ramp 20 is assembled and placed on the floor. The support panel 64 may be attached to the step 49, such as by screws or bolts. In an embodiment, the support panel is part of the adjacent step 50. In another embodiment, the step-down ramp may include multiple support panels for two or more of the steps that would otherwise rely on adjacent steps or another load bearing member for support.

Referring again to FIG. 3, the ramp 20 may include a load bearing portion 80 that supports the steps 41-48 (the steps upward from the steps 49-50). The load bearing portion 80 may include feet 82, 84, and 86 (each of which is illustrated in FIG. 2) that are attached to a planar panel 88 (e.g., 0.5 inch (") thick oriented strand board or plywood). The feet 82, 84, and 86 may face downward (e.g., parallel with the direction of gravitational force), each foot 82, 84, and 86 having an end that contacts a plane (e.g., the floor of the shipping destination) that is parallel with the horizontal axis A. For example, the bottommost surface of each foot 82, 84, and 86 (and the support panel 64 and the lowest step 50) may contact the floor when the ramp 20 is fully-assembled such that the ramp 20 is declined relative to the floor.

Figure 6:
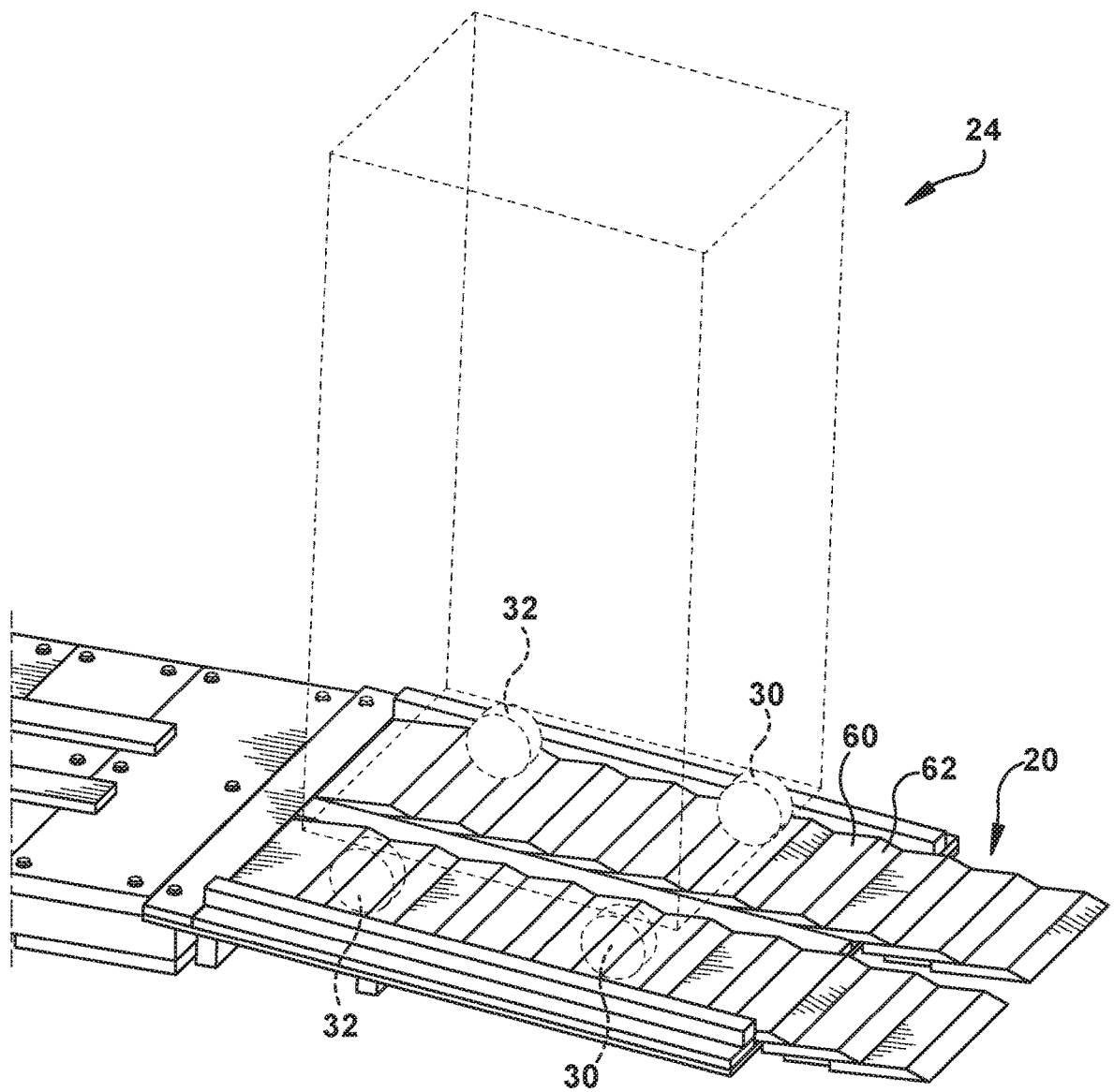
FIG. 6 is an oblique view of the medical device treatment system partway down the momentum arresting ramp of FIG. 1.
Figure 7:
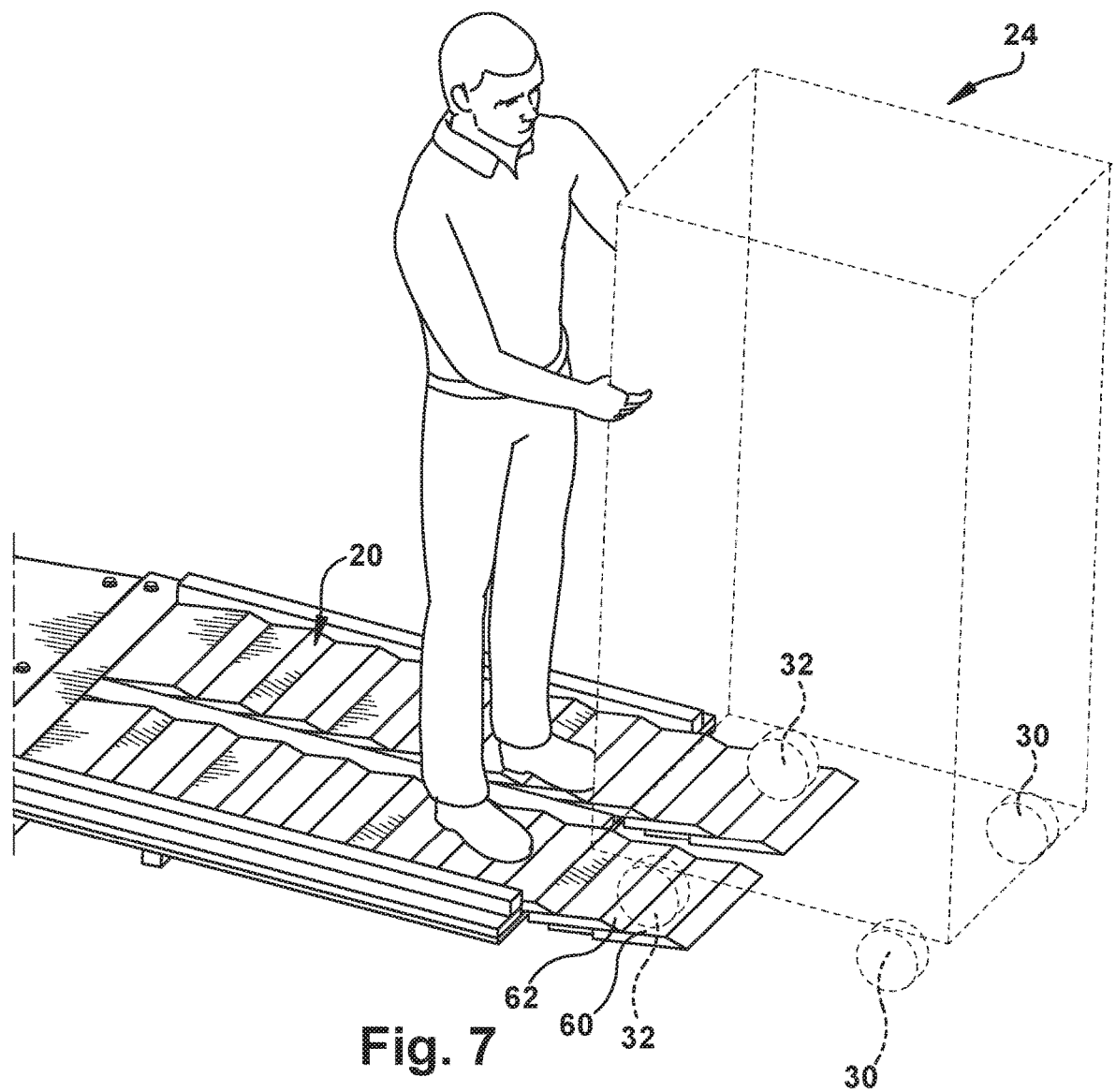
FIG. 7 is an oblique view of the medical device treatment system mostly off of the momentum arresting ramp of FIG. 1.

Turning now to FIGS. 6-7, sliding the medical device treatment system 24 down the ramp 20 may include rolling the front wheels 30 and the rear wheels 32 down the ramp 20. For example, a single user may urge the medical device treatment system 24 forward down the ramp 20 by pushing (or pulling) the medical device treatment system 24.

While the medical device treatment system 24 moves forward on the ramp 20, at most only the front wheels 30 or only the rear wheels 32 move downward at any moment throughout the sliding of the front wheels 30 and the rear wheels 32 along the ramp 20. Only allowing at most the front wheels 30 or the rear wheels 32 to move downward at a given time allows gravity to reduce forward momentum of the medical device treatment system 24. Accordingly, allowing at most the front wheels 30 or the rear wheels 32 to move downward at a given time may reduce the amount of forward momentum of the medical device treatment system 24 that the user would otherwise resist when moving the medical device treatment system 24 down the ramp 20.

For example, when each front wheel 30 moves forward and upward along a slider receiving surface 60 corresponding to (i.e., supporting) that front wheel 30, each rear wheel 32 moves forward and downward along a transition surface 62 corresponding to (i.e., supporting) that rear wheel 32. When the rear wheels 32 move forward and upward along a corresponding slider receiving surface 60 the front wheels 30 move forward and downward along a corresponding transition surface 62. Gravity pulls the wheels 30 or 32 on the slider receiving surfaces 60 downward and backward, which allows the forward momentum of the medical device treatment system 24 to be reduced in certain embodiments or eliminated if desired—absent outside intervention (e.g., the user or another user urging the medical device treatment system 24 backward).

When moving the medical device treatment system 24 down the entire ramp 20, upward (momentum arresting) motion and downward (momentum building) motion of the front wheels 30 and the rear wheels 32 may repeat in sequence. For example, as the front wheels 30 move forward and up an intermediate part of the slider receiving surface 60 of the step 45 the rear wheels 32 move forward and up an intermediate part of the slider receiving surface 60 of the step 41. Once the front wheels 30 reach the transition surface 62 of the step 45, the rear wheels 30 continue moving forward and up the slider receiving surface 60 of the step 41 as the front wheels 30 move forward and down the transition surface 62 of the step 45. Once the rear wheels 32 reach the transition surface 62 of the step 41, the rear wheels 32 move forward and down the transition surface 62 of the step 41 as the front wheels 30 move forward and up the slider receiving surface 60 of the step 46. Once the rear wheels 32 reach the slider receiving surface 60 of the step 42, the rear wheels 32 move forward and up the slider receiving surface 60 of the step 42 as the front wheels 30 move forward and up the slider receiving surface 60 of the step 46.

Next, the above phases are repeated for the following steps 42 and 46. Thus, as the front wheels 30 move forward and up an intermediate part of the slider receiving surface 60 of the step 46 the rear wheels 32 move forward and up an intermediate part of the slider receiving surface 60 of the step 42. Once the front wheels 30 reach the transition surface 62 of the step 46, the rear wheels 30 continue moving forward and up the slider receiving surface 60 of the step 42 as the front wheels 30 move forward and down the transition surface 62 of the step 46. Once the rear wheels 32 reach the transition surface 62 of the step 42, the rear wheels 32 move forward and down the transition surface 62 of the step 42 as the front wheels 30 move forward and up the slider receiving surface 60 of the step 47.

The above phases may be repeated in like fashion until the front wheels 30 reach the floor, at which point the rear wheels 32 may continue moving along the step-down ramps 40 until reaching the floor.

It will be appreciated, then, that when the front wheels move forward and horizontally (e.g., parallel to the horizontal axis) along a corresponding horizontal slider receiving surface (or up an inclined slider receiving surface, or down a declined slider receiving surface, as the case may be) the rear wheels move forward and downward along a corresponding declined transition surface (or upward along an inclined transition surface, or horizontally along a horizontal transition surface, as the case may be). In such an embodiment, when each rear wheel moves forward and horizontally along a corresponding horizontal slider receiving surface (or up an inclined slider receiving surface, or down a declined slider receiving surface, as the case may be) each front wheel moves forward and downward along a corresponding transition surface (or upward along an inclined transition surface, or horizontally along a horizontal transition surface, as the case may be).

Throughout movement of the medical device treatment system 24 along the ramp 20, each front wheel 30 may never be in contact with one of the transition surfaces 62 when the corresponding rear wheel 32 is in contact with another one of the transition surfaces 62. For example, as represented best in FIG. 3, each front wheel 30 contacts and slides down one of the transition surfaces 62 while the corresponding rear wheel 32 contacts and slides along one of the slider receiving surfaces 60.

In an embodiment, the front and rear wheels both move forward and down a corresponding transition surface simultaneously and the momentum is reduced by later moving the rear wheels and/or the front wheels forward and up an inclined slider receiving surface.

Figure 8:
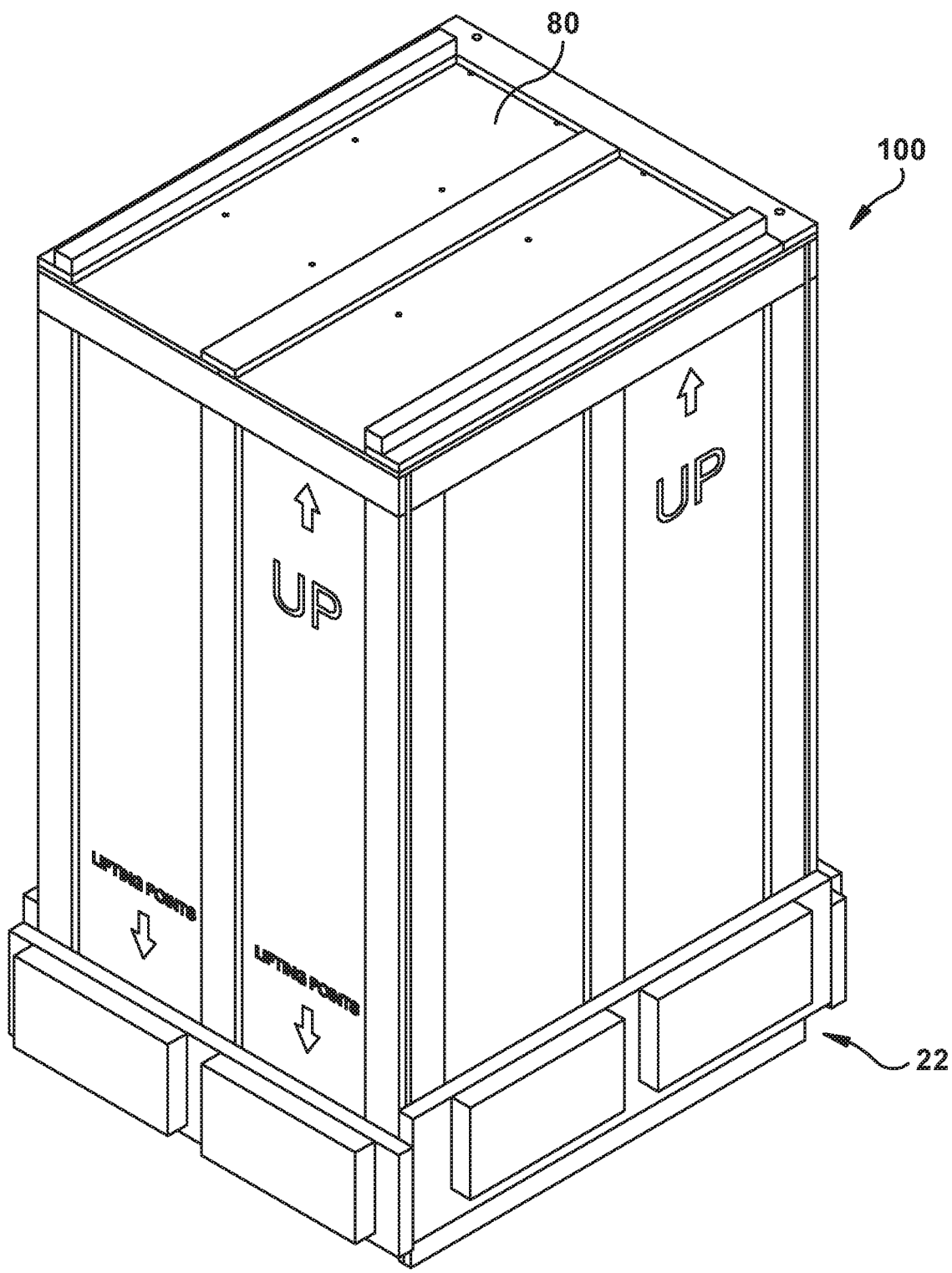
FIG. 8 is an oblique view of a crate including a load bearing portion of the momentum arresting ramp of FIG. 1, which forms a top of the crate.
Figure 9:
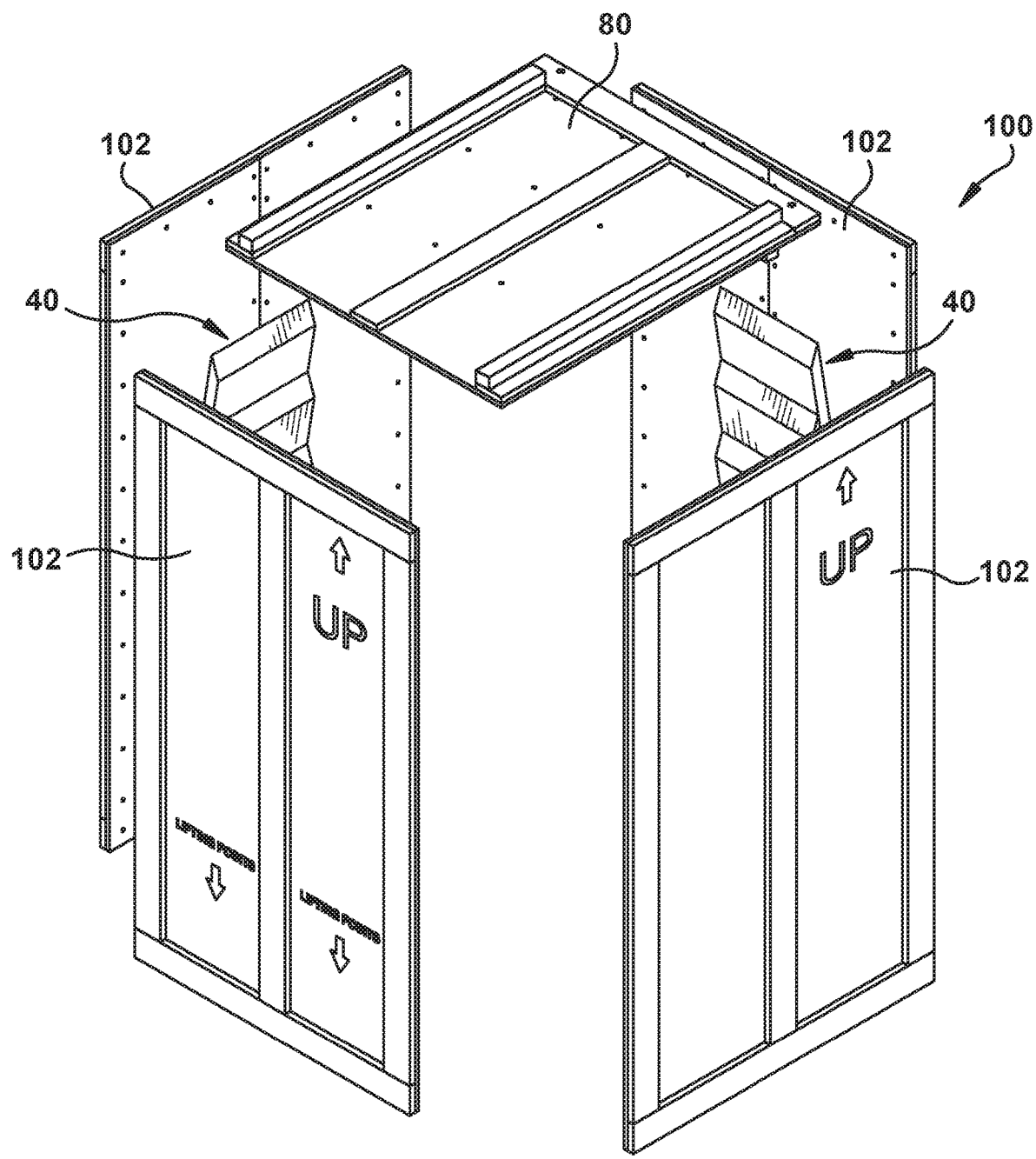
FIG. 9 is an exploded oblique view of sidewalls and the top of the crate of FIG. 8.

Turning to FIG. 8 and then to FIG. 9, a crate 100 (an example of packaging) may include the ramp 20 and the shipping skid 22 (both of which are shown and identified in FIG. 3 above). The medical device treatment system 24 (shown in FIG. 3) may be inside the crate 100, on top of the shipping skid 22 in the manner discussed above regarding FIGS. 1-2.

At least part of the ramp 20 may form a wall of the crate 100. For example, the load bearing portion 80 forms the top of the crate 100 and is attachable to the shipping skid 22, as discussed above with respect to FIG. 1 and further below with reference to FIG. 10.

The shipping skid 22 may form a base of the crate 100. For example, the shipping skid 22 may be substantially parallel with the top of the crate 100 when the crate 100 is fully assembled in the manner shown in FIG. 8. In an embodiment, the crate is a wooden shipping crate.

Briefly turning to FIG. 9, two of the sides 102 of the crate 100 may be temporarily attached to the respective step-down ramps 40. For example, step-down ramp 40 may be bolted to the interior of a corresponding side 102.

The sides 102, the load bearing portion 80, and the shipping skid 22 may be assembled in any suitable manner such that the crate 100 is suitable for transportation. For example, each adjacent side 102 may be bolted or screwed to one another along with the load bearing portion 80 and the shipping skid 22.

Figure 10:
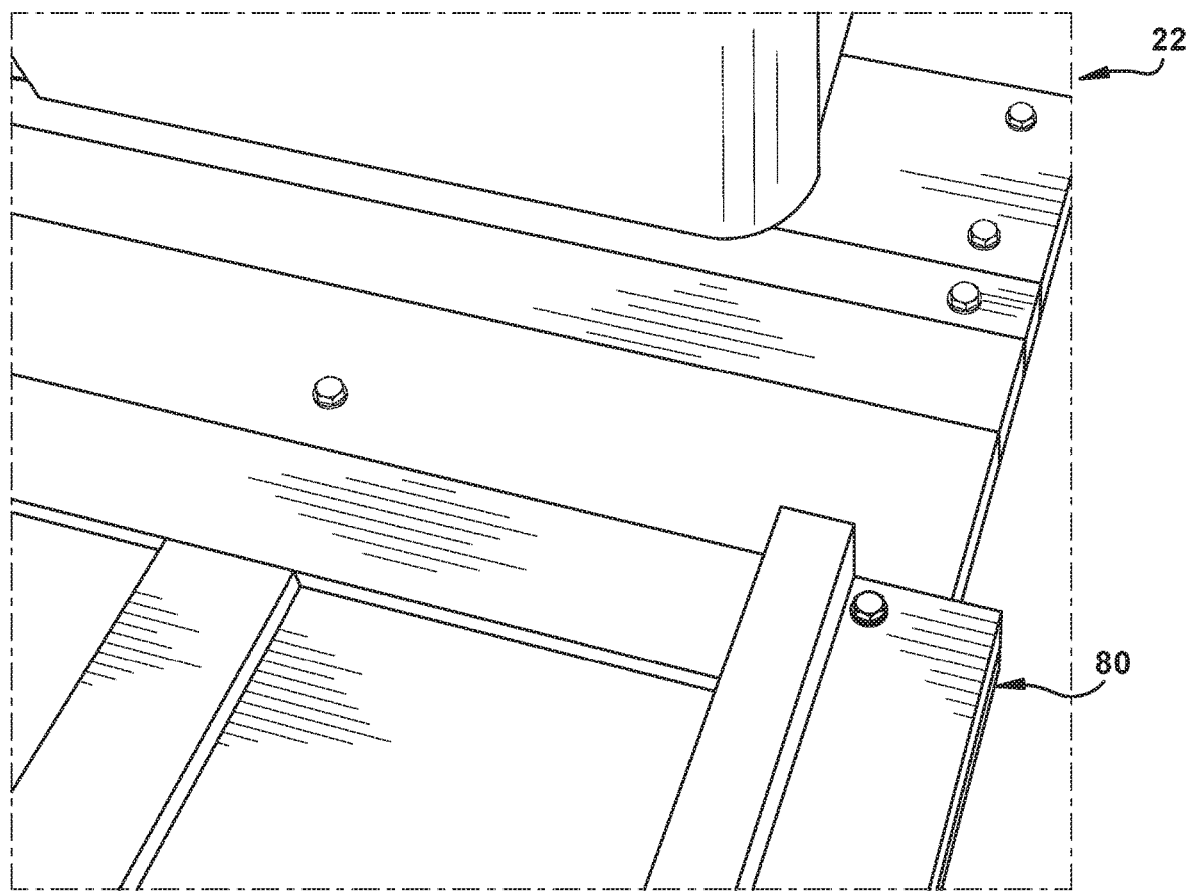
FIG. 10 is an oblique top view of the shipping skid attached to the load bearing portion of the momentum arresting ramp of FIG. 1.
Figure 11:
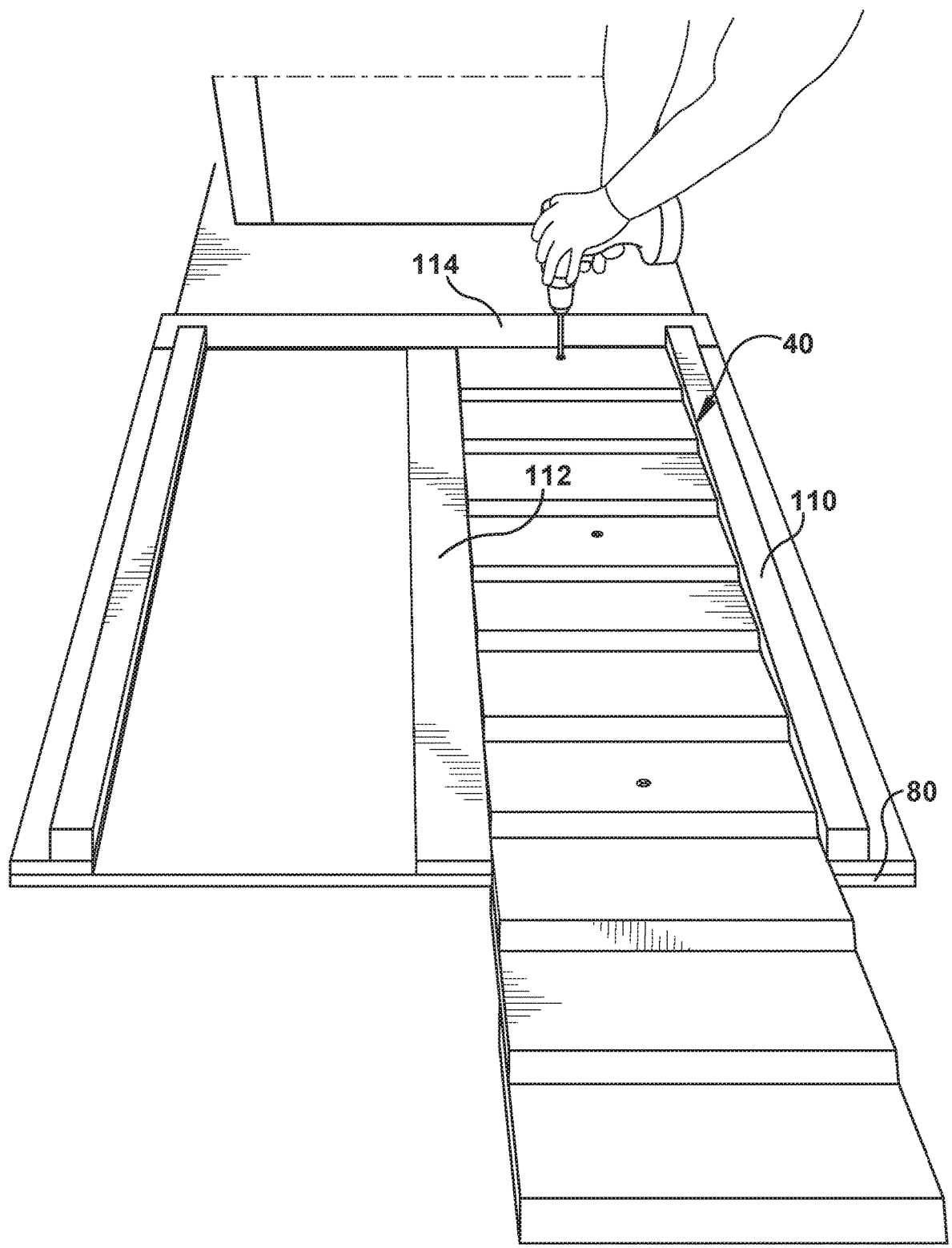
FIG. 11 is an oblique front view of the momentum arresting ramp of FIG. 1, in a partially assembled state, including a step-down ramp.
Figure 12:
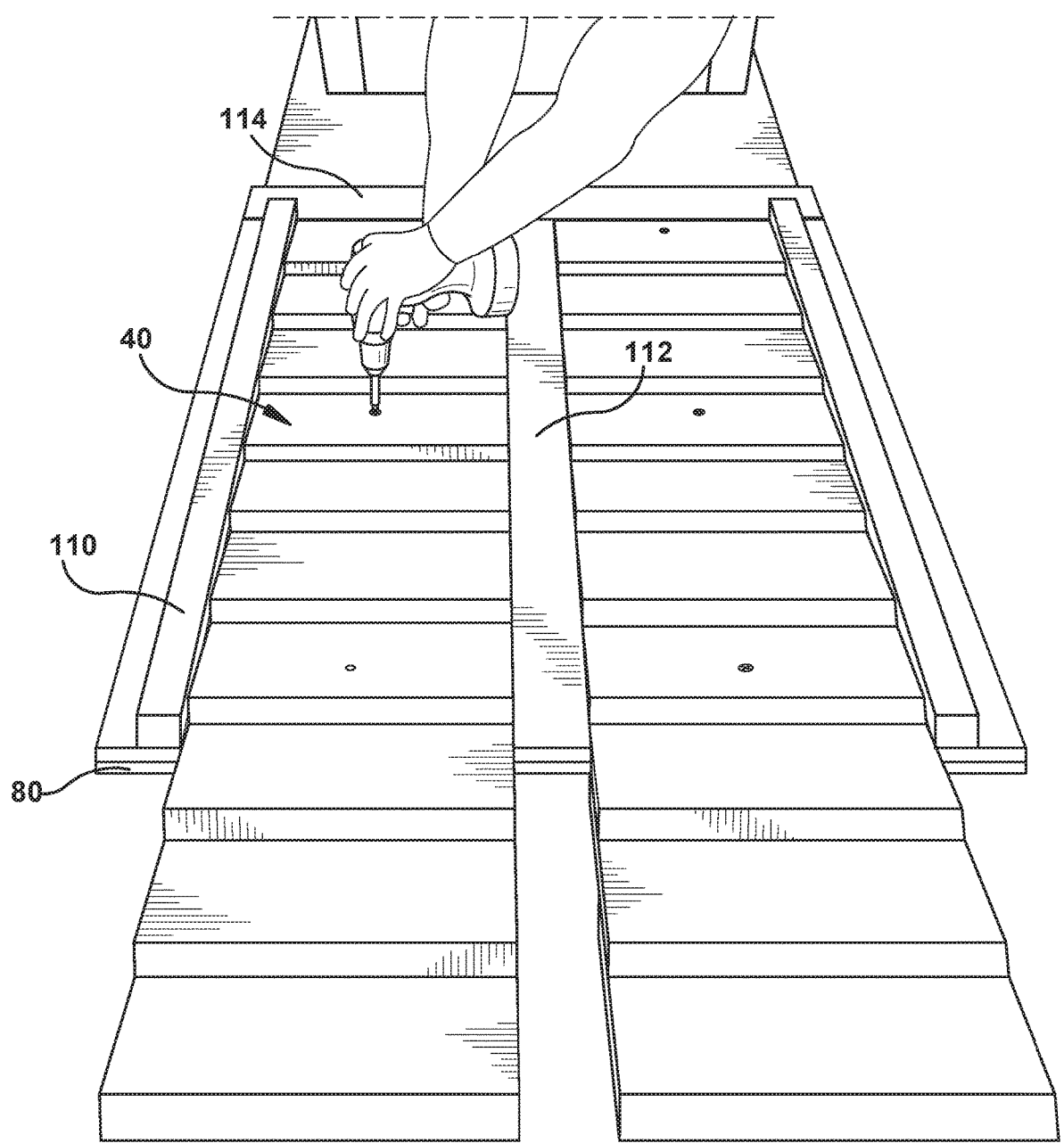
FIG. 12 is an oblique front view of the momentum arresting ramp of FIG. 1, in an assembled state, including two step-down ramps.

After disassembling the crate 100, the ramp 20 can be fully assembled to unload the medical device treatment system 24 from the shipping skid 22. FIGS. 10-12 illustrate assembly of the ramp 20. For example, as shown in FIG. 10, the load bearing portion 80 may be placed adjacent to the shipping skid 22 and then attached to the shipping skid 22 (e.g., by bolting the load bearing portion 80 to the shipping skid 22). In an embodiment, the shipping skid and the load bearing portion 80 are attached to one another by a hook or a latch.

As shown in FIGS. 11-12, the step-down ramps 40 are placed on opposite sides of the load bearing portion 80. For example, each step-down ramp 40 may be placed between a corresponding side bumper 110 and a middle ramp structural support 112 of the load bearing portion 80, which may laterally align the step-down ramp 40 with each side of the shipping skid 22.

The load bearing portion 80 may include a rear ramp structural support 114 that abuts the rear end of the step-down ramp 40. Abutting the rear end of the step-down ramp 40 allows the step-down ramp 40 to start at a predetermined position in front of the shipping skid 22. A top of the rear end of the step-down ramp 40 may be at the same elevation and flush with a top of the rear ramp structural support 114. In an embodiment, a top of the rear end of the step-down ramp may be at the same elevation and/or flush with a top of the front of the shipping skid.

When the step-down ramps 40 are between the corresponding bumper 110 and ramp structural support 112 and abutting or adjacent to the rear ramp structural support 114, each step-down ramp 40 may be attached to the load bearing portion 80. For example, a rear and intermediate portion of the step-down ramp 40 may be attached to the load bearing portion 80 (e.g., by a bolt or screw as represented in FIGS. 11-12).

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A momentum arresting ramp, including:
a plurality of steps that are at least partially offset from one another along a first axis, wherein each step includes a slider receiving surface that faces in a first direction that is transverse to the first axis, wherein the slider receiving surface of each step preceding a following step, respectively, of the plurality of steps is offset in the first direction from the respective following step;
wherein in aggregate the plurality of steps decline relative to the first axis;
wherein each of the plurality of steps includes a transition surface that is declined relative to its own slider receiving surface and declined less than 90 degrees relative to the first axis toward the respective following step, whereby the slider receiving surface and the transition surface are at respective first and second angles relative to the first axis, the first angle being different than the second angle;
wherein each slider receiving surface is parallel to or inclined relative to the first axis.

2. The momentum arresting ramp of claim 1, wherein each slider receiving surface is inclined relative to the first axis by an incline angle anywhere above 0 degrees up to 20 degrees.

3. The momentum arresting ramp of claim 1, wherein each step overlaps each adjacent step of the plurality of steps.

4. The momentum arresting ramp of claim 1, wherein the decline of the aggregate the plurality of steps relative to the first axis is a decline angle less than 20°.

5. The momentum arresting ramp of claim 1, wherein the slider receiving surfaces are planar.

6. The momentum arresting ramp of claim 1, wherein the ramp further includes feet that face in a second direction opposite the first direction, each foot having an end that contacts a plane that is parallel with the first axis.

7. The momentum arresting ramp of claim 6, wherein the second direction is parallel to the direction of gravity acting on the ramp.

8. Packaging, including:
the ramp of claim 1, wherein at least part of the ramp forms a wall of the packaging.

9. The packaging of claim 8, wherein a load bearing portion with a planar major surface forms a top of the packaging and is configured to attach to a base of the packaging.

10. A momentum arresting ramp in combination with a device:
wherein the device includes:
a first slider; and
a second slider that is offset from the first slider by a first distance along a first axis;
wherein the momentum arresting ramp includes:
a plurality of steps that are at least partially offset from one another along the first axis, wherein each step includes a slider receiving surface that faces in a first direction that is transverse to the first axis, wherein the slider receiving surface of each step preceding a following step, respectively, of the plurality of steps is offset in the first direction from the respective following step;
wherein in aggregate the plurality of steps decline relative to the first axis;
wherein each of the plurality of steps includes a transition surface that is declined relative to its own slider receiving surface and is declined less than 90 degrees relative to the first axis toward the respective following step, whereby the slider receiving surface and the transition surface are at respective first and second angles relative to the first axis, the first angle being different than the second angle;
wherein the transition surfaces and the slider receiving surfaces are configured such that when the first slider and the second slider are on the ramp, and the first slider is in contact with one of the transition surfaces, the second slider is in contact with one of the slider receiving surfaces, wherein the first and second sliders and the transition surfaces are spaced apart along the first axis such that the first slider is never in contact with one of the transition surfaces when the second slider is in contact with another one of the transition surfaces.

11. The momentum arresting ramp and a device of claim 10, wherein when the first slider and the second slider contact the ramp a center of gravity of device remains axially between the first slider and the second slider along the first axis, whereby an actual tilt angle of the device is unable to exceed a tipping point angle of the device.

12. The momentum arresting ramp and a device of claim 10, wherein the sliders are wheels.

13. The momentum arresting ramp and a device of claim 10, wherein the device further includes:
   a third slider that is offset from the first slider along a first lateral direction perpendicular to the first axis and the first direction;
   a fourth slider that is offset from the second slider along the lateral direction and that is offset from the third slider by the first distance along the first axis.

14. The momentum arresting ramp and a device of claim 10, wherein each slider receiving surface is inclined relative to the first axis by an angle anywhere above 0 degrees up to 20 degrees.

15. A pallet in combination with the momentum arresting ramp and the device of claim 10, wherein the first slider and the second slider rest on a support surface of the pallet assembly, and wherein the ramp is configured to attach to the pallet.

16. A momentum arresting ramp, comprising:
   a plurality of slider receiving surfaces; and
   a plurality of transition surfaces;
   wherein the slider receiving surfaces and the transition surfaces are alternately arranged relative to one another;
   wherein, in aggregate, the slider receiving surfaces and the transition surfaces are disposed at a declination angle relative to a first axis;
   wherein the slider receiving surfaces are parallel to or inclined less than 90 degrees relative to the first axis; and
   wherein the transition surfaces are declined greater than 0 degrees and less than 90 degrees relative to the first axis.

17. A method of moving a device along a momentum arresting ramp:
   wherein the device includes:
      a first slider; and
      a second slider that is offset from the first slider by a first distance along a first axis;
   wherein the momentum arresting ramp includes:
      a plurality of steps that are at least partially offset from one another along the first axis, wherein each step includes a slider receiving surface that faces in a first direction that is transverse to the first axis, wherein the slider receiving surface of each step preceding a following step, respectively, of the plurality of steps is offset in the first direction from the respective following step;
   wherein in aggregate the plurality of steps decline relative to the first axis;
   wherein each of the plurality of steps includes a transition surface that is declined relative to its own slider receiving surface and is declined less than 90 degrees relative to the first axis toward the respective following step, whereby the slider receiving surface and the transition surface are at respective first and second angles relative to the first axis, the first angle being different than the second angle;
   wherein the method includes:
      sliding the first slider and the second slider forward along the first axis and down the ramp, wherein at most only one of the first slider and the second slider move downward at any moment throughout the sliding of the first slider and the second slider down the ramp.

18. The method of claim 17, wherein when the first slider moves downward along one of the transition surfaces, the second slider either moves horizontally or upward along one of the slider receiving surfaces.

19. The method of claim 17, wherein the first slider contacts and slides down one of the transition surfaces while the second slider contacts and slides along one of the slider receiving surfaces, and wherein throughout sliding the first slider is never in contact with one of the transition surfaces when the second slider is in contact with another one of the transition surfaces.

20. The method of claim 17, wherein the first slider slides forward and down a first transition surface of the transition surfaces, afterward the second slider slides forward and down a second transition surface of the transition surfaces, afterward the first slider slides forward and down a third transition surface of the transition surfaces, and afterward the second slider moves forward and down a fourth transition surface of the transition surfaces or the first transition surface.

21. The method of claim 20, wherein the first slider slides forward and down the first transition surface of the transition surfaces while the second slider slides forward on a first slider receiving surface of the slider receiving surfaces, afterward the second slider slides forward and down the second transition surface of the transition surfaces while the first slider slides forward on a second slider receiving surface of the slider receiving surfaces, afterward the first slider slides forward and down the third transition surface of the transition surfaces while the second slider slides forward on a third slider receiving surface of the slider receiving surfaces, and afterward the second slider moves forward and down the fourth transition surface of the transition surfaces or the first transition surface.

* * * * *